UNITED STATES PATENT OFFICE 2,128,845

TREATMENT OF MILK PRODUCTS

Robert P. Myers and Samuel M. Weisberg, Baltimore, Md., assignors to Sealtest System Laboratories, Inc., New York, N. Y., a corporation of Maryland No Drawing. Application March 24, 1937, Serial No. 132,870

18 Claims. (Cl. 99—59)

The present invention relates to a vitamin concentrate and the process for preparing it from dairy by-products such as skimmilk, buttermilk, whey, milk sugar wash liquor, condensed skimmilk, skimmilk powder (reconstituted), whey powder (reconstituted), buttermilk powder (reconstituted), which we shall term for convenience "milk by-products".

Previous attempts to prepare commercially satisfactory vitamin concentrates from whey or other milk by-products have not been entirely successful chiefly because of the difficulty encountered due to the presence of large amounts of milk sugar. Whey, for example, as is well known, contains large amounts of water soluble vitamins, principally $B_1$ and $G(B_2)$. Dried whey, therefore, is an excellent source of $B_1$ and $G(B_2)$ but normally contains about 70% of milk sugar. Dried whey preparations which have had the lactose content reduced by crystallization methods, such as those described in Patent No. 2,006,699 and by others, have a large amount of lactose still remaining, that is substantially 30% or more. Attempts to prepare potent concentrates from these lactose containing whey products by means of solvent extraction and related processes are hampered by the caramelization of the milk sugar, its solubility in the solvents, and consequent building up of lactose in the new preparation since lactose is not volatile.

The processes of this invention described below have been developed in order to prepare a concentrate which contains the full content of the water soluble vitamins originally present in the milk by-product but which has had the lactose entirely removed, i. e., is devoid of lactose as well as the simple sugars derived from the splitting of lactose. Briefly, we accomplish this objective by fermenting the lactose present in any of the milk by-products to volatile substances which are very easily removed by evaporation or distillation.

In order to remove the lactose by fermentation, we employ a microorganism which readily ferments lactose as well as the simple sugars derived from the splitting of lactose such as glucose and galactose, and which preferably synthesizes water soluble vitamins without destroying any of the vitamins already present in the whey. The organism which is well suited for this purpose is the lactose fermenting yeast *Saccharomyces fragilis*, though a number of other species of lactose fermenting yeasts such as *Saccharomyces flava lactis*, *Saccharomyces acidi lactici*, *Saccharomyces lactis*, *Torula cremoris*, *Torula kephir*, *Torula sphaerica*, *Torula lactis*, *Torula lactis, condensi*, *Torula globosa*, and other lactose fermenting yeasts described as "yeast from Koumys", "yeast from Kephir", etc., may be employed.

*Saccharomyces fragilis*, which is preferred, converts lactose and simple sugars very rapidly in a well aerated milk by-product such as whey or skimmilk into alcohol and carbon dioxide and produces practically no acid or other by-products. The amount of alcohol produced in an aerated culture of a cheese whey, for example at temperatures between 25 and 30° C. in a twenty-four hour period was found to be approximately 2.0 to 2.5% by weight.

Other groups of micro-organisms, though not considered as desirable as the ones mentioned above, may also be used in this process. *Clostridium butyricum*, certain species of the Lactobacillus group, some of the lactic Streptococci, and certain species of molds may be used to exhaust the lactose from the milk by-product such as whey without destroying water soluble vitamins already present, and may, under suitable conditions, synthesize water soluble vitamins as with the micro-organisms previously described.

While an abundance of yeast cells rich in water soluble vitamins is obtained in the normal fermentation process, if desired, a number of materials, namely salts such as ammonium phosphate, carbohydrates such as dextrin, amino acids such as asparagin, nitrogenous materials such as peptone, and extracts such as malt extract, may be added to the whey or other milk by-product which is being fermented to stimulate the growth of the micro-organism such as yeast.

In referring to the treatment of whey hereafter we do so for purposes of illustration since the process and results are likewise associated with other milk by-products.

Whey, for example, such as that obtained from the manufacture of casein, whey obtained from the manufacture of various types of cheese such as cottage, Cheddar, etc., or the wash liquor residue obtained in the manufacture of milk sugar and other milk by-products may be fermented with *Saccharomyces fragilis* or other organisms until the sugar is completely exhausted. By following the procedures outlined below, the normal lactose content (4.5 to 5.5%) of the whey is removed in sixteen to eighteen hours.

It is to be understood that the concentrates in accordance with this invention contain substantially all of the vitamins present in the original milk by-product plus those contributed by the organism.

The reaction in the case of whey may be left distinctly acid without interfering with the growth of the yeast. We have found pH values between 4.5 and 5.0 to be satisfactory in retarding bacterial growth and in permitting rapid multiplication of the yeast culture, though other pH values between 3.5 and 7.0 are satisfactory. By employing an acid reaction of about pH 4.5, sterilization of the whey is unnecessary and therefore raw whey is employed. It is essential, however, that the fresh whey be inoculated before it has an opportunity to undergo fermentation or decomposition by other types of microorganisms.

Pasteurization of the whey is desirable under certain conditions. When sweet whey, such as that obtained from Swiss and Cheddar cheese, is utilized it is particularly advantageous to employ pasteurization. Flash pasteurization at temperatures between 165° F. and 185° F. is satisfactory and may fit into certain operations better than pasteurization at 145° F. for 30 minutes. The lower temperature and longer holding period are preferred, however, wherever practicable. Such a heat treatment does not impair the content of the water soluble vitamins but does destroy the majority of the contaminating microorganisms which may produce undesirable changes in the whey during the course of the fermentation process.

Inoculation of the whey or other milk by-product with a vigorous pure culture of *Saccharomyces fragilis* results in the rapid fermentation at temperatures between 25 and 30° C. though fermentation proceeds satisfactorily at temperatures below or above this range. Aeration of the fermenting whey, particularly where a large volume of whey is employed, is desirable since it speeds up the fermentation by the yeasts, removes the $CO_2$ which tends to accumulate, and prevents the development of lactic acid by bacteria. For purposes of aeration, compressed air is preferably injected in small streams from distributing pipes located in various parts of the fermentation tank. It will be understood that the whey is preferably, although not necessarily, aerated and agitated during fermentation. While mechanical means such as stirrers may be used, we prefer agitation by aeration, since aeration we find has the important advantages in that it also maintains a favorable oxidation reduction potential.

Fermentation of the whey or other milk by-product should be allowed to continue for several hours after a negative test for lactose has been obtained using some quick method such as is well suited for plane use. This insures that every trace of lactose will be removed. As soon as the fermentation is completed, the fermented material may then be handled in a number of different ways which are outlined below.

Complete conversion of the lactose into volatile compounds, namely alcohol and $CO_2$ takes place during the fermentation step and such conversion facilitates the condensation in a vacuum pan to any required solids content and the drying operation to form a substantially dehydrated end product.

One procedure consists in condensing the fermented whey or other milk by-product in a vacuum pan to any desired concentration up to a total solids content of about 30 to 40%. This group of products will be referred to as Group I.

The material of Group I may then be dried, e. g. drum dried, spray dried, or kiln dried, to a low moisture content, e. g. substantially dehydrated. Where the product is to be drum dried or spray dried, the preliminary condensation in a vacuum pan may in some cases be eliminated, i. e., the fermented unconcentrated product is directly dried. The dried products will be referred to as Group II.

Another procedure is to filter or centrifuge the fermented whey to remove the yeast cells and any precipitated protein material such as casein and albumin. The soluble albumin may then be removed by adding a suitable neutralizing and flocculating agent such as an alkaline earth oxide, hydroxide or carbonate, for example, $Ca(OH)_2$, or $CaCO_3$ until the pH approximates 7.0, heating to bring about coagulation, and filtering out the coagulated albumin. The filtrate is now partially condensed in a vacuum pan and the condensate is allowed to crystallize and the resultant crystals of calcium lactate removed by centrifuging, or other suitable means. The residual liquor from the crystals will thus be substantially freed from albumin, lactates and wholly free from lactose but will contain the water soluble vitamins in exceedingly high concentration. This liquor may be further concentrated in the vacuum pan and dried by some suitable means. The above procedure may be applied to the unconcentrated fermented whey as well as to any concentration thereof. Instead of condensing the filtrate as just described it may be dried in any suitable manner without further treatment giving a vitamin concentrate containing lactates which may be used in certain applications. Products processed as just described will be referred to as Group III.

A simpler procedure than that described in connection with Group III consists in separating out from the fermented casein or cheese whey, the yeast cells and precipitated protein by sedimentation, filtration or centrifugation, and concentrating the clarified liquor to dryness or any desired solids content, to form the required vitamin concentrate. Also, the separated protein and yeast cells or other organism are concentrated, e. g., compressed or dried to produce a vitamin concentrate.

Fresh skimmilk or buttermilk obtained from manufacture of sweet cream butter may also be fermented with *Saccharomyces fragilis* or other organism as described and a condensed or dried product prepared in a similar manner to that described for whey. The fermented skimmilk or buttermilk preparation will contain all the constituents of normal skimmilk or buttermilk such as the protein, milk salts and vitamins but will be entirely free of lactose and simple sugars derived from lactose. Skimmilk or buttermilk products of this type will be referred to as Group IV.

Our delactosed whey powders and condensed whey products (as well as other similar treated milk by-products) show a very high level of water soluble vitamins, and we have found by means of biological assays that the delactosed whey powders for example have a vitamin C potency at least 40 times that of the original milk from which they were prepared. By a simple alcoholic extraction treatment now to be described, this forty-fold increase may be multiplied many times.

The products herein described in themselves as stated constitute valuable concentrates of the water soluble vitamins but it is readily possible to effect a very substantial increase in the vitamin content by simple further treatment of the products belonging to Groups I, II, III, and IV.

These various products may be extracted with dilute or concentrated ethanol, methanol, acetone or similar water miscible solvents. The water soluble vitamins dissolve readily in the solvent and extraneous matter precipitates out and is removed by filtration. The solvent extracts are now partially or completely dried by evaporation or distillation of the solvent, preferably under vacuum, and a highly potent residue of vitamin concentrate is obtained free from lactose and low in protein and mineral matter. Preferably, we form a completely dried product.

The products of Group II, particularly delactosed whey powder, may be extracted by refluxing with methanol three times in the presence of a stream of $CO_2$. Each refluxing requires 30 minutes and one liter of methanol is used for each pound of powder. The methanol extracts are combined and chilled at 0°–10° F. The extract is then filtered and the filtrate is treated with an adsorbing agent for the B-vitamins such as English fuller's earth. Three adsorptions are made at room temperature successively using 250 grams earth, and 50 grams per each original 5 lbs. of delactosed whey powder. The adsorbates are filtered off, washed with acidulated water, air dried and then eluted 3 times with 0.2% NaOH for three hours at 0° C. For each gram of adsorbate 75 cc. of the eluting agent is used. The earth is then centrifuged off, and the elution liquor is neutralized with hydrochloric acid and concentrated in vacuo. The concentrate so obtained will contain approximately 4,000 gamma of lactoflavia ($B_2$) (per gram) which represents a 4,000 fold concentration of the lactoflavin content of ordinary whey. This concentrate may be further treated to remove impurities and yield a still purer more concentrated product.

For example the concentrate above may be extracted with methanol and or acetone and further impurities such as salts thus rendered insoluble. The methanol extract in turn may be submitted to the entire purification process above described for the delactosed whey powder.

We have found that a B-vitamin concentrate can be made from delactosed whey powder by extracting it with the higher alcohols. For example even octyl alcohol will extract lactoflavin ($B_2$) from delactosed whey powder. We have also found that as the length of the carbon chain in the alcohol is increased more and more impurities remain undissolved in the alcohol. Accordingly, the use of the higher alcohols, e. g., secondary butyl, secondary amyl, and 2-ethylbutyl is believed of substantial value in our process. Moreover, the lactoflavin ($B_2$) can be readily extracted with water from the higher alcohol because (1) Lactoflavin ($B_2$) is much more soluble in water than in higher alcohols (2) Water and the higher alcohols are immiscible.

Another highly effective procedure is to extract the products belonging to Groups I, II, III, and IV but more especially those belonging to Groups II and III with solvents miscible in water such as absolute methanol and/or ethanol and an acidifying agent for the solvent, for example, dried hydrochloric acid gas. For example, in the case of the products of Group II, we disperse the dry product in absolute methanol and/or ethanol and dry hydrochloric acid gas is passed into the mixture until the desired acidity is attained.

Instead of forming a dispersion as just recited, we acidify the solvent with the hydrochloric acid gas and then disperse the dried product of Group II or Groups I to IV as the case may be therein. The extraneous matter precipitates out and is filtered off and the solvent extract is evaporated or distilled preferably under vacuum. The residue constitutes a highly potent vitamin concentrate free from lactose and low in protein and mineral matter.

It will be noted that with the products in Groups I, II, and IV no attempt need be made to neutralize the natural lactic acid present. It has been found that this lactic acid is a valuable aid in the solvent extraction of water soluble vitamins as it causes them to go into solution readily.

Another highly effective procedure consists in mixing the fermented delactosed milk by-product, e. g., whey, with an adsorbing agent. For this purpose such agents as Fuller's earth, charcoal or silica gel may be used. The purpose of this step is to concentrate the water soluble vitamins. The adsorbing agent is then filtered off from the fermented liquor and dried. This product now contains a relatively high concentration of water-soluble vitamins and is substantially free from the other constituents of the whey. The water soluble vitamins can be further concentrated by extraction of the dried adsorption product in any suitable manner. This operation on a delactosed by-product yields a purer water-soluble vitamin concentrate than is obtainable from a lactose containing milk by-product.

A partial analysis of our dried delactosed whey products yields the following results (for delactosed casein whey powder):—

| | Per cent |
|---|---|
| Moisture | 4.86 |
| Acidity calculated as lactic acid | 18.58 |
| Nitrogen calculated as protein | 34.32 |
| Ash | 30.90 |
| Lactose | 0.00 |
| Reducing substances | 0.62 |

(For dried delactosed cottage cheese whey):—

| | Per cent |
|---|---|
| Moisture | 7.28 |
| Acidity calculated as lactic acid | 13.63 |
| Nitrogen calculated as protein | 31.70 |
| Ash | 30.42 |
| Lactose | 0.00 |
| Reducing substances | 0.59 |

It will be noted that these products are free from lactose and that the protein and mineral content are easily removed if desired by extraction with water miscible solvents since these are insoluble in the solvents so that a highly potent water soluble vitamin preparation may be readily obtained by evaporation of the solvent.

The concentrated milk by-products produced by the processes described above either in condensed form or substantially dehydrated, have a concentration of water soluble vitamins greater than that of the milk from which the by-product is derived. This is due in part to the fact that such condensed or dried concentrates contain substantially all of the original vitamins present in the milk by-product as well as those synthesized by the organism and also by reason of the fact that the several products of this invention are in concentrated form. Therefore, the concentrates produced in accordance with this invention possess the characteristic of having a high level of water soluble vitamins.

The important characteristic of the concentrates obtained by our process is the freedom from lactose, that is, the concentrates whether in condensed or substantially dehydrated condition are devoid of sugar. In other words, the concentrates may be properly described as being delactosed, since they are devoid of lactose and the simple sugars derived from lactose.

Referring to the process described in connection with Groups I and II above, we find that in the case of a cheese whey concentrate for example, it is characterized by freedom from lactose and contains albumin, lipoids associated therewith, milk salts, lactic acid, as well as substantially all of the water soluble vitamins of the whey and an abundance of yeast cells rich in the water soluble vitamins.

In the case of a whey concentrate for example, produced in accordance with Group III, we find that the concentrate is free of lactose and also substantially free from lactic acid, lactates, albumin and yeast cells, but contains in addition to the water soluble vitamins in highly concentrated form, the soluble milk salts.

Also by way of example, the delactosed skim milk referred to particularly in connection with Group IV is devoid of lactose but contains casein, albumin, lipoids, milk salts and the soluble vitamins of milk and an abundance of yeast cells rich in water soluble vitamins.

Where the various end products of the several processes are given an extraction treatment as described, the final concentrates have a high content of water soluble vitamins and in addition are substantially devoid of lactose and substantially free of albumin, lipoids, yeast cells, lactic acid or lactates and milk salts.

Referring to the simpler procedure described hereinabove which consists in separating out from the fermented casein or cheese whey, the yeast cells and precipitated protein by sedimentation, filtration or centrifugation, and concentrating the clarified liquor to dryness or any desired solids content to form the required vitamin concentrate, the concentrated clarified liquor is substantially free from lactose and the simple sugars derived therefrom, as well as yeast cells, but contains albumin, lipoids, lactic acid and milk salts.

As heretofore explained, one of the features of the present invention resides in fermenting out the lactose with a lactose fermenting organism while at the same time retaining all of the vitamins present in the milk product. In other words, the fermenting operation does not impair or injure the vitamins of the milk by-product.

While we have referred herein to the extraction treatment in connection with Groups I to IV, this is purely by way of illustration since the extraction treatment is operable with facility upon any and all of the condensed or dehydrated concentrated products described herein.

We have referred above to milk by-products vitamin concentrates in condensed or dehydrated form having a high concentration of water soluble vitamins and devoid of lactose and simple sugars derived therefrom. It should be noted that the high concentration of the vitamin is additionally made possible since the removal of the lactose reduces the non-vitamin solids whereby upon condensing or dehydration the vitamin content is multiplied many times more than would be the case if the lactose remained.

It should be understood that our primary products and by-products are useful in other applications than in the field of vitamin preparations. That is to say, the use of the products and by-products of this invention is not restricted to the value of the particular product by reason of its vitamin content. Thus in the baking industry, the various products of this invention by reason of their make-up have application as dough improvers, and in the ice-cream industry are useful to increase the solids content of the ice-cream without adding lactose, and in the manufacture of cheese, the products of this invention will substantially improve the nutritional value, which is also true in connection with ice-cream as well as bread.

Relative to the by-products, it is to be understood in connection with Group III, for example, that such valuable by-products as compressed yeast, calcium albuminate and calcium lactate are available.

It is to be understood that products of this invention may be mixed where desirable, and likewise one or more of the products of this invention may be mixed with other vitamin concentrates, for example, concentrates of vitamins A, C, D and E or mixtures thereof.

Again, the vitamin concentrates of this invention which are derived from dairy by-products and are generally B complex vitamins, may be mixed with similar vitamins derived from other sources, for example, from cereals, such as wheat germ.

Various modifications and changes may be made in the processes and products described herein, all of which are comprehended within the scope of the appended claims.

This application is a continuation-in-part of our copending application Serial No. 34,629, filed August 3, 1935.

We claim:

1. The process of making from whey a vitamin containing delactosed product which comprises pasteurizing the whey, fermenting substantially all of the lactose present in the whey with a lactose fermenting organism and eliminating the presence of lactose and simple sugars derived from the splitting of lactose and without reducing the vitamin content of the original whey.

2. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product.

3. The process of making from a milk by-product a vitamin containing delactosed product which comprises fermenting substantially all of the lactose present in the milk by-product with a lactose fermenting organism and eliminating as volatile compounds the presence of lactose and simple sugars derived from the splitting of lactose and without reducing the vitamin content of the original milk by-product, and removing the volatile compounds.

4. The process of making from a milk by-product a vitamin containing delactosed product which comprises fermenting substantially all of the lactose present in the milk by-product with a lactose fermenting yeast and eliminating the presence of lactose and simple sugars derived from the splitting of lactose and without reducing the vitamin content of the original milk by-product.

5. The process of making from a milk by-product a vitamin containing delactosed product which comprises fermenting substantially all of the lactose present in the milk by-product with a lactose fermenting organism capable of synthesizing water soluble vitamins and eliminating the presence of lactose and simple sugars derived from the splitting of lactose and without reducing the vitamin content of the original milk by-product, and synthesizing additional water soluble vitamins.

6. The process of making from whey a vitamin containing delactosed product which comprises fermenting substantially all of the lactose present in the whey with a lactose fermenting organism and eliminating the presence of lactose and simple sugars derived from the splitting of lactose and without reducing the vitamin content of the original whey.

7. The process of making from whey a vitamin containing delactosed product which comprises fermenting substantially all of the lactose present in the whey with a lactose fermenting yeast and eliminating the presence of lactose and simple sugars derived from the splitting of lactose and without reducing the vitamin content of the whey.

8. The process of making from whey a vitamin containing delactosed product which comprises fermenting substantially all of the lactose present in the whey with *Saccharomyces fragilis* and eliminating the presence of lactose and simple sugars derived from the splitting of lactose and without reducing the vitamin content of the original whey.

9. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product, and concentrating the fermented product whereby concentration of the vitamin content thereof is increased.

10. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product, removing suspended protein material and cells of the organism, adjusting the reaction to substantially pH 7 with an alkali earth compound, heating to coagulate the albumen, removing the albumen, and drying.

11. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product, separating out from the fermented product precipitated protein and cells of the organism, and concentrating the liquor whereby concentration of the vitamin content is increased.

12. The process of making a vitamin containing delactosed product from a milk by-product which comprises fermenting all of the lactose present in the milk by-product with a lactose fermenting organism and removing lactic acid, cells of the organism, carbon dioxide and alcohol formed by fermenting the lactose without reducing the vitamin content of the original milk by-product.

13. The process of making a vitamin containing delactosed product from a milk by-product which comprises fermenting all of the lactose present in the milk by-product with a lactose fermenting organism and removing cells of the organism, carbon dioxide and alcohol formed by fermenting the lactose without reducing the vitamin content of the original milk by-product.

14. The process of making a vitamin containing delactosed product from a milk by-product which comprises fermenting all of the lactose present in the milk by-product with a lactose fermenting organism and removing lactic acid, carbon dioxide and alcohol formed by fermenting the lactose without reducing the vitamin content of the original milk by-product.

15. The process of making a vitamin containing delactosed product from a milk by-product which comprises fermenting all of the lactose present in the milk by-product with a lactose fermenting organism and removing carbon dioxide and alcohol formed by fermenting the lactose without reducing the vitamin content of the original milk by-product.

16. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product and extracting the water soluble vitamins.

17. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product, and concentrating the fermented product whereby concentration of the vitamin content thereof is increased, and extracting the water soluble vitamins from the concentrated product.

18. The process of making from a milk by-product a vitamin containing delactosed product which comprises fermenting substantially all of the lactose present in the milk by-product with a lactose fermenting organism and eliminating the presence of lactose and simple sugars derived from the splitting of lactose and without reducing the vitamin content of the original milk by-product, and concentrating the fermented product to dryness whereby concentration of the vitamin content thereof is increased, and extracting the vitamins from said dry product with a higher alcohol.

ROBERT P. MYERS.
SAMUEL M. WEISBERG.